(12) United States Patent  
Sung et al.

(10) Patent No.: US 9,602,831 B2  
(45) Date of Patent: Mar. 21, 2017

(54) METHOD AND APPARATUS FOR PROCESSING VIDEO SIGNALS

(71) Applicant: LG ELECTRONICS INC., Seoul (KR)

(72) Inventors: Jaewon Sung, Seoul (KR); Sehoon Yea, Seoul (KR); Moonmo Koo, Anyang-si (KR); Jin Heo, Anyang-si (KR); Taesup Kim, Anyang-si (KR); Jiwook Jung, Seoul (KR); Eunyong Son, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 259 days.

(21) Appl. No.: 14/383,491

(22) PCT Filed: Mar. 5, 2013

(86) PCT No.: PCT/KR2013/001726  
§ 371 (c)(1),  
(2) Date: Sep. 5, 2014

(87) PCT Pub. No.: WO2013/133587  
PCT Pub. Date: Sep. 12, 2013

(65) Prior Publication Data  
US 2015/0049814 A1 Feb. 19, 2015

Related U.S. Application Data

(60) Provisional application No. 61/608,078, filed on Mar. 7, 2012.

(51) Int. Cl.  
*H04N 11/02* (2006.01)  
*H04N 19/513* (2014.01)  
(Continued)

(52) U.S. Cl.  
CPC ....... *H04N 19/513* (2014.11); *H04N 13/0048* (2013.01); *H04N 19/176* (2014.11); *H04N 19/52* (2014.11); *H04N 19/597* (2014.11)

(58) Field of Classification Search  
USPC ...................................... 375/240.01–240.29  
See application file for complete search history.

(56) References Cited

U.S. PATENT DOCUMENTS

| | | | |
|---|---|---|---|
| 9,332,273 B2 * | 5/2016 | Kim | .............. H04N 19/56 |
| 2006/0262856 A1 * | 11/2006 | Wu | .............. H04N 19/597 |
| | | | 375/240.19 |

(Continued)

FOREIGN PATENT DOCUMENTS

KR 10-2007-0033863 A 3/2007  
KR 10-2008-0035429 A 4/2008  
(Continued)

*Primary Examiner* — Leron Beck  
(74) *Attorney, Agent, or Firm* — Dentons US LLP

(57) ABSTRACT

The method for processing video signals according to the present invention determines a motion vector list including at least one of spatial motion vectors, temporal motion vectors, and variation vectors as motion vector candidates of a target block, extracts motion vector identifying information which specifies the motion vector candidates used as the predicted motion vectors of the target block, determines the motion vector candidates corresponding to the motion vector identifying information as the predicted motion vectors of the target block, and performs motion compensation on the basis of the predicted motion vectors. The present invention enables accurate motion vector prediction by forming motion vector candidates and induces motion vectors of a target block therefrom, and can enhance coding efficiency by reducing the amount of transmitted residual data.

7 Claims, 9 Drawing Sheets

(51) Int. Cl.
*H04N 19/597* (2014.01)
*H04N 19/52* (2014.01)
*H04N 19/176* (2014.01)
*H04N 13/00* (2006.01)

(56) References Cited

U.S. PATENT DOCUMENTS

| | | | | |
|---|---|---|---|---|
| 2007/0071107 A1* | 3/2007 | Ha | ............... | H04N 19/61 375/240.24 |
| 2013/0176390 A1* | 7/2013 | Chen | ............... | H04N 19/597 348/43 |
| 2013/0229485 A1* | 9/2013 | Rusanovskyy | .... | H04N 13/0048 348/43 |
| 2013/0243103 A1* | 9/2013 | Sasaki | ............... | H04N 13/00 375/240.25 |
| 2013/0293676 A1* | 11/2013 | Sugio | ............... | H04N 19/597 348/43 |
| 2014/0341291 A1* | 11/2014 | Schwarz | ............... | H04N 19/597 375/240.16 |

FOREIGN PATENT DOCUMENTS

| KR | 10-2008-0064078 A | 7/2008 |
|---|---|---|
| KR | 10-2010-0105877 A | 9/2010 |
| KR | 10-2011-0006696 A | 1/2011 |

\* cited by examiner

FIG. 3

```
gdv_info() {
num_gdv
for( i=0; i<num_gdv;i++)
{
   ref_view_id
   gdv_x
}
```

METHOD AND APPARATUS FOR PROCESSING VIDEO SIGNALS

This application is a National Stage Application of International Patent Application No. PCT/KR2013/001726, filed on Mar. 5, 2013, which claims the benefit of Provisional Application No. 61/608,078, filed on Mar. 7, 2012, each of which are incorporated herein by reference in their entirety.

FIELD OF THE INVENTION

The present invention relates to a method and apparatus for coding video signals.

BACKGROUND ART

Compression encoding refers to a series of signal processing techniques for transmitting digitalized information through a communication circuit or for storing digitalized signals in a storage medium in an adequate format. Compression encoding subjects may correspond to sound (or audio data), images (or video data), text, and so on, and, most particularly, a technique of performing compression encoding on images (or video data) is referred to as video image compression. The general characteristics of a multi-view video image is that it includes spatial redundancy, temporal redundancy, and view redundancy.

DETAILED DESCRIPTION OF THE INVENTION

Technical Objects

An object of the present invention is to enhance coding efficiency of video signals.

Technical Solutions

The present invention performs inter-view prediction by using view identification information and a variation vector of a reference view.

In case a current slice belongs to random access unit and a non-base view, the present invention acquires view identification information and a variation vector of a reference view.

The present invention induces a variation vector of a target block by using depth data within a depth picture corresponding to the target block.

The present invention induces a motion vector of a target block by using a motion vector list including at least one of a spatial motion vector, a temporal motion vector, and a variation vector.

The present invention uses a region-based adaptive loop filter with respect to depth data.

Effects of the Invention

By performing inter-view prediction using a variation vector, the present invention may enhance accuracy in video data prediction by using an inter-view correlation. Additionally, by performing limited coding of the variation vector only in case the current slice belongs to a random access unit and a non-base view, unnecessary or repeated usage of bits may be minimized. Meanwhile, by inducing a variation vector based upon depth data, instead of extracting a variation vector from a bitstream, the present invention may save the number of bits that are required for coding the variation vector.

Furthermore, the present invention configures motion vector candidates, and, by inducing a motion vector of a target block from the configured motion vector candidates, the present invention may allow a more accurate motion vector prediction to be performed, and, accordingly, by reducing a transmitted amount of residual data, the present invention may enhance coding efficiency. Additionally, by applying a region-based adaptive loop filter with respect to depth data, the present invention may enhance picture quality and may also reduce complexity caused by the application of the filter, and, at the same time, the present invention may enhance coding efficiency via variable filtering.

BRIEF DESCRIPTION OF THE DRAWINGS

FIG. 3 illustrates a variation information syntax as an exemplary embodiment having the present invention applied thereto.

BEST MODE FOR CARRYING OUT THE PRESENT INVENTION

Figure 1:
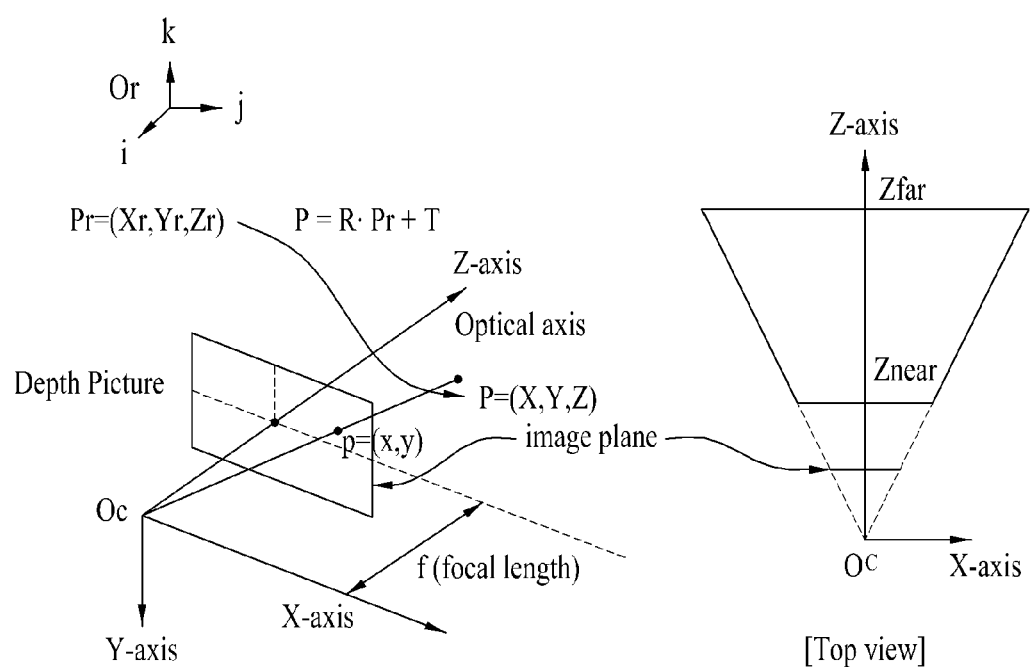
FIG. 1 illustrates a concept of depth as an exemplary embodiment having the present invention applied thereto.

In order to achieve the above-described objects, a video signal processing method may acquire a variation vector of a target block, may decide a motion vector list respective to the target block, may extract motion vector identification information respective to the target block from a bitstream, may determine a motion vector candidate corresponding to the motion vector identification information as a predicted motion vector of the target block, and may perform motion compensation based upon the predicted motion vector.

According to the present invention, the motion vector list may be configured of motion vector candidates for a predicted motion vector of the target block, and the motion vector candidates may include at least one of a spatial motion vector, a temporal motion vector, and the variation vector.

According to the present invention, the variation vector may be extracted from a bitstream along with view identification information of a reference view based upon information on a number of variations, the information on a number of variations may signify a number of pairs of coded view identification information of a reference view and variation vector, and the view identification information of a reference view may signify view identification information of the neighboring view being referred to by the current view.

According to the present invention, position information of a corresponding block of a depth picture may be acquired from position information of the target block of a texture picture, depth data respective to position information of a corresponding block of the depth picture may be acquired, a variation vector of the target block may be induced by using the acquired depth data and a camera parameter.

According to the present invention, the variation vector may be extracted, when a current slice including the target block belongs to a random access unit, and when the current slice has a non-base view, a picture within the random access unit may signify a picture being coded by referring only to a slice being located in a same time range, the non-base view may signify a view that does not correspond to a base view, and the base view may signify a view that is decoded independently from another view without performing any inter-view prediction.

According to the present invention, whether or not to apply a region-based adaptive loop filter with respect to a current pixel value may be decided based upon a variance of a depth block within the depth picture, and, in case the region-based adaptive loop filter is applied, a current pixel value being filtered may be acquired by applying a weight value to a neighboring pixel value.

According to the present invention, the motion vector list respective to the target block may be acquired by verifying whether or not a reference picture of the target block is identical to a reference picture of a neighboring block, and, in case the reference picture of the target block is identical to the reference picture of the neighboring block, by adding a motion vector of the neighboring block having the same reference picture to the motion vector list, and, in case the reference picture of the target block is not identical to the reference picture of the neighboring block, by applying a scaling factor to the motion vector of the neighboring block; herein, the scaling factor is decided based upon a temporal distance between a current picture including the target block and a reference picture of the target block, and by adding the scaled motion vector of the neighboring block to the motion vector list.

According to the present invention, temporal motion vector may signify a motion vector belonging to a block located in a same position as the target block within a reference picture belonging to a same view as the target block, and the reference picture belonging to the same view may be specified by reference index information of a picture including the block located in the same position as the target block.

According to the present invention, extracting reference index information of the target block may be extracted from a bitstream, a comparison is performed for determining whether or not a view of a reference picture corresponding to the reference index information of the target block is identical to a view respective to view identification information of the reference view, and, in case it is verified that the views are identical based upon the comparison, a variation vector corresponding to the view identification information of the reference view may be added to a motion vector list.

Mode for Carrying Out the Present Invention

A technique of performing compression encoding or decoding on multiview video signal data is realized based upon spatial redundancy, temporal redundancy, and redundancy existing between views. Additionally, in case of a multiview image, in order to realize a three-dimensional (3D) image, a multiview texture image taken (or captured) from 2 or more views and a multiview depth image corresponding to the multiview texture image should be coded. In coding the depth image, it will be evident that compression coding may be performed based upon spatial redundancy, temporal redundancy, or inter-view redundancy. Each sample value of the depth image expresses a distance between the camera and the respective pixel, and a detailed description of the same will be provided hereinafter with reference to FIG. 1. Additionally, in this specification, terms such as depth information, depth data, depth picture, depth sequence, depth coding, depth bitstream, and so on, may be flexibly interpreted as information related to depth. Furthermore, in this specification, the term coding may include the concepts of both coding and decoding, and such terms may be flexibly interpreted within the technical spirit and technical scope of the present invention.

FIG. 1 illustrates a concept of depth as an exemplary embodiment having the present invention applied thereto.

Referring to FIG. 1, a camera position (Oc) indicates a starting point of a 3D camera coordinate system, and a Z-axis (optical axis) forms a straight line with a viewing direction of the eye. An arbitrary one point P=(X, Y, Z) of the camera coordinate system may be reflected as an arbitrary one point p=(x,y) within a two-dimensional (2D) image plane, which is perpendicular to the Z-axis. Herein, the arbitrary one point p=(x,y) within the 2D image plane may be expressed as a texture value or color value of the arbitrary one point P=(X, Y, Z) of the 3D coordinate system, and, in this case, the 2D image plane may signify a texture picture. Meanwhile, p=(x,y) within the 2D image plane may be expressed as a Z value of P=(X, Y, Z) of the 3D coordinate system, and, in this case, the 2D image plane may signify a depth picture or a depth map.

Additionally, although P=(X, Y, Z) of the 3D coordinate system indicates an arbitrary one point of the camera coordinate system, when image-capturing is performed by using multiple cameras, a reference coordinate system commonly shared by all of the multiple cameras may be required. In FIG. 1, an arbitrary one point of a reference coordinate system based upon point Ow may be determined as Pw=(Xw, Yw, Zw), and Pw=(Xw, Yw, Zw) may be converted (or translated) to the arbitrary one point P=(X, Y, Z) of the camera coordinate system by using a 3×3 rotation matrix R and a 3×1 translation vector T. For example, the point P may be acquired by using Equation 1.

$$P = R \times P_w + T \qquad \text{Equation 1}$$

Based upon the description provided above, the depth picture may be defined once again as a collection of diverse information corresponding to a distance between a camera position and an actual object, wherein the distance is digitized to a relative value based upon a position of the camera. Depth information within the depth picture may be acquired from a Z value of a 3D coordinate P=(X, Y, Z) within a camera coordinate system, which corresponds to an arbitrary pixel of a texture picture. Herein, the Z value may correspond to a value belonging to a range of real numbers, and this may be quantized to a value belonging to a range of integers, thereby being used as depth information. For example, the depth information may be quantized as shown in Equation 2 or Equation 3 shown below.

$$Z_q = \text{round}\left(255 \times \frac{Z - Z_{near}}{Z_{far} - Z_{near}}\right) \quad \text{Equation 2}$$

$$Z_q = \text{round}\left(255 \times \frac{\frac{1}{Z} - \frac{1}{Z_{far}}}{\frac{1}{Z_{near}} - \frac{1}{Z_{far}}}\right) \quad \text{Equation 3}$$

Herein, Zq represents quantized depth information, and, referring to a [Top view] of FIG. 1, Znear may signify the lower limit of a Z coordinate value, and Zfar may signify the upper limit of a Z coordinate value. And, the quantized depth information, which is quantized in accordance with Equation 2 or Equation 3 shown above, may have an integer value within a range of 0~255.

The depth picture may be coded along with a texture image sequence or may be coded as a separate sequence, and, in this case, diverse exemplary embodiments may be applied for backward compatibility with the conventional codec. For example, a depth coding technique may be applied as a supplemental technique in order to establish backward compatibility with an HEVC codec, and, alternatively, the depth coding technique may also be applied as an extension technique in H.264/AVC multiview video coding. Hereinafter, exemplary embodiments of a method and apparatus for predicting texture data by using depth data will be described in detail.

Figure 2:
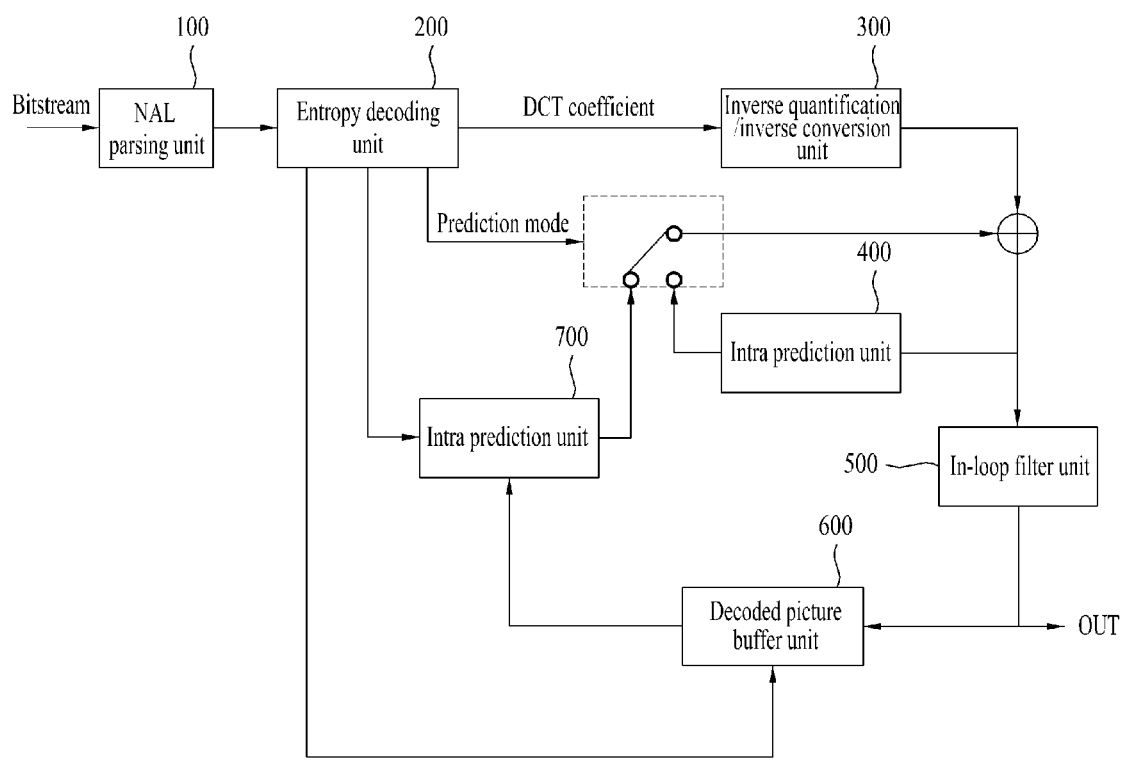
FIG. 2 illustrates a general block view of a video decoder as an exemplary embodiment having the present invention applied thereto.

FIG. 2 illustrates a general block view of a video decoder as an exemplary embodiment having the present invention applied thereto.

Referring to FIG. 2, a video decoder may include a NAL parsing unit (100), an entropy decoding unit (200), an inverse quantification/inverse conversion unit (300), an intra prediction unit (400), an in-loop filter unit (500), a decoded picture buffer unit (600), and an inter prediction unit (700). Herein, texture data and depth data being inputted to the NAL parsing unit may be transmitted to one bitstream, and, alternatively, each type of data may also be transmitted to a separate bitstream. In order to decode the inputted bitstream, the NAL parsing unit (100) may perform parsing in NAL units. In case the inputted bitstream corresponds to data related to multiview (e.g., 3-Dimensional Video), the inputted bitstream may further include a camera parameter. The camera parameter may include an intrinsic camera parameter and an extrinsic camera parameter, and the intrinsic camera parameter may include a focal length, an aspect ratio, a principal point, and so on, and the extrinsic camera parameter may include position information of a camera in a global coordinate system, and so on.

The entropy decoding unit (200) may extract a quantized conversion coefficient, coding information for predicting a texture picture and a depth picture, and so on, from the parsed bitstream by performing entropy decoding. The inverse quantification/inverse conversion unit (300) acquires a conversion coefficient by applying a quantization parameter to the quantized conversion coefficient, and, the, by performing inverse conversion on the acquired conversion coefficient, the inverse quantification/inverse conversion unit (300) may decode texture data or depth data. Herein, the decoded texture data or depth data may signify residual data respective to prediction processing. Additionally, a quantization parameter respective to a depth block may be determined based upon a complexity level of the texture data. For example, in case the texture block respective to the depth block corresponds to a region having a high complexity level, a low quantization parameter may be determined, and, in case the texture block respective to the depth block corresponds to a region having a low complexity level, a high quantization parameter may be determined. The complexity level of a texture block may be decided based upon a differential value between neighboring pixels that are adjacent to one another within a recovered texture picture as shown in Equation 4.

$$E = \frac{1}{N}\sum_{(x,y)} [|C_{x,y} - C_{x-1,y}| + |C_{x,y} - C_{x-1,y}|]^2 \quad \text{Equation 4}$$

In Equation 4, E may signify a complexity level of texture data, C may represent recovered texture data, and N may signify a number of pixels within a texture data region for which the complexity level is to be calculated. Referring to Equation 4, the complexity level may be calculated by using a differential value between texture data corresponding to a (x,y) position and texture data corresponding to a (x−1,y) position and a differential value between texture data corresponding to a (x,y) position and texture data corresponding to a (x+1,y) position. Additionally, the complexity level may be calculated with respect to teach of a texture picture and a texture block, and a quantization parameter may be induced by using the calculated complexity levels as shown below in Equation 5.

$$\Delta QP = \min\left(\max\left(\alpha \log_2 \frac{E_f}{E_b}, -\beta\right), \beta\right) \quad \text{Equation 5}$$

Referring to Equation 5, the quantization parameter may be decided based upon a ratio between a complexity level of a texture picture and a complexity level of a texture block. Each of α and β may correspond to a variable integer that is induced by the decoder, or each of α and β may correspond to an integer that is pre-decided by the decoder.

The intra prediction unit (400) may perform prediction within a screen by using the recovered texture data within a current texture picture. Prediction may also be performed within the screen with respect to a depth picture by using the same method as the texture picture. Meanwhile, in order to reduce a block distortion effect, the in-loop filter unit (500) may apply an in-loop filter on each of the coded block. The filter enhances the picture quality of a decoded picture by softening edge portions of the block. Texture pictures or depth picture that have been processed with filtering may be outputted or stored in the decoding picture buffer unit (600) in order to be used as reference pictures. Meanwhile, since the characteristics of texture data and the characteristics of depth data are different from one another, in case of coding the texture data and coding the depth data by using the same in-loop filter, the coding efficiency may be degraded. Accordingly, a separate in-loop filter that is to be used for the depth data is required to be defined. Hereinafter, as an in-loop filtering method that can be used for efficiently coding depth data, a region-based adaptive loop filter and a trilateral loop filter will be described in detail.

With respect to the region-based adaptive loop filter, whether or not to apply the region-based adaptive loop filter may be decided based upon a variance of the depth block.

Herein, the variance of the depth block may be defined be a difference between a maximum pixel value and a minimum pixel value within the depth block. Whether or not to apply the filter may be decided by a comparison between a variance of the depth block and a pre-decided threshold value. For example, when the variance of the depth block is greater than or equal to the pre-decided threshold value, since this indicates that the difference between the maximum pixel value and the minimum pixel value within the depth block is large, the filter may be applied. Conversely, when the variance of the depth block is smaller than the pre-decided threshold value, the filter may not be applied. Based upon the compared result, in case the filter is applied, a pixel value of the filtered depth block may be induced by applying a predetermined weight value to a neighboring pixel value. Herein, the predetermined weight value may be decided based upon a position difference between a pixel that is currently being filtered and a neighboring pixel and/or a differential value between a pixel value of a pixel that is currently being filtered and a pixel value of a neighboring pixel. Additionally, the pixel value of the neighboring pixel does not correspond to the pixel value of the pixel that is currently being filtered, and the pixel value of a neighboring pixel may signify any one of the pixel values included in the depth block.

The trilateral loop filter according to the present invention may be similar to the region-based adaptive loop filter, yet the trilateral loop filter is different in that texture data are additionally taken into consideration. More specifically, by comparing the three conditions shown below, the trilateral loop filter may extract depth data of a neighboring pixel satisfying the conditions shown below.

$$p-q \leq \sigma 1 \qquad \text{Condition 1.}$$

$$D(p)-D(q) \leq \sigma 2 \qquad \text{Condition 2.}$$

$$V(p)-V(q) \leq \sigma 3 \qquad \text{Condition 3.}$$

Condition 1 compares a position difference between a current pixel (p) and a neighboring pixel (q) within a depth block with a pre-decided parameter σ1, and Condition 2 compares a difference between depth data of a current pixel (p) and depth data of a neighboring pixel (q) with a pre-decided parameter σ2, and Condition 3 compares a difference between texture data of a current pixel (p) and texture data of a neighboring pixel (q) with a pre-decided parameter σ3.

After extracting the neighboring pixels satisfying the three conditions shown above, the current pixel (p) may be filtered by using a median value or average value of the corresponding depth data.

The Decoded Picture Buffer unit (600) performs a function of storing or disclosing a texture picture or a depth picture, which has been coded previously, in order to perform inter-screen prediction. At this point, in order to store the texture picture or depth picture in the Decoded Picture Buffer unit (600) or to disclose the texture picture or depth picture from the Decoded Picture Buffer unit (600), a frame_num and POC (Picture Order Count) of each picture may be used. Furthermore, in performing depth coding, among the picture that have been coded previously, since there may exist depth pictures corresponding to a view that is difference from view of the current depth picture, in order to use such pictures as the reference picture, view identification information that is configured to identify the view of the depth picture may also be used. In order to more flexibly perform inter-screen prediction, the Decoded Picture Buffer unit (600) may manage a reference picture by using a Memory Management Control Operation Method, a Sliding Window Method, and so on. This is to integrate a memory of a reference picture and a memory of a non-reference picture to a single memory and to manage the single integrated memory and to efficiently perform management by using a small number of memories. In performing depth coding, the depth pictures may be marked with separate markings in order to differentiate the depth pictures from the texture pictures within the Decoded Picture Buffer unit, and information for differentiating each depth picture may be used during the marking process. The reference pictures that are being managed by performing the above-described process may be used in the inter prediction unit (700) in order to perform depth coding.

The inter prediction unit (700) may perform motion compensation of a current block by using the reference picture that is stored in the Decoded Picture Buffer unit (600) and motion information. In this specification, the term motion information may be understood as a broader concept including a motion vector, reference index information, and so on. Additionally, the motion compensation may be performed by using a reference picture within a L0 reference picture list, and, the motion compensation may also be performed by using multiple reference pictures from a L1 reference picture in addition to the L0 reference picture list.

In case of a multiview image captured (or taken) by multiple cameras, a disparity (or variation) between views may occur in accordance with a position difference between the cameras. In order to compensate such inter-view variation (or disparity), a disparity vector (or variation vector) may be used. The disparity vector may be defined by a difference between a position of a target block belonging to the current view and a position of a reference block belonging to a neighboring view. Hereinafter, a method for acquiring a disparity vector (or variation vector) will be described in detail with reference to FIG. 3 to FIG. 6.

FIG. 3 illustrates a variation information syntax as an exemplary embodiment having the present invention applied thereto.

The variation information of the present invention may include view identification information of a reference view (ref_view_id) and a disparity vector (or variation vector) (gdv_x). The view identification information of the reference view may signify view identification information of a neighboring view, which is referred to by the current view, and, as described above, the disparity vector (or variation vector) may signify a difference between a position of a target block belonging to the current view and a position of a reference block belonging to a neighboring view. Additionally, the variation information (or disparity information) may be transmitted by forming a pair between view identification information of the reference view and a disparity vector respective to the view identification information of the reference view. For example, a reference picture may be specified by view identification information of the reference view, and a reference block within a reference picture for the current block may be specified based upon a disparity vector. More specifically, the view identification information of the reference view and the disparity vector may be in a mutual correspondence relation. As described above, in case the view identification information of the reference view and the disparity vector are in a correspondence relation and are therefore transmitted as pair, disparity number information (num_gdv) may be further used. The disparity number information may indicate a number of view identification information of the reference view and disparity vector pairs.

For example, when a disparity (or variation) information syntax is invoked, the disparity number information is parsed, and the view identification information of the reference view and disparity vector may be parsed in accordance with the parsed disparity number information. Meanwhile, the parsing of the disparity information may be limited to be performed under a consistent condition, and this will be described in detail with reference to FIG. 4.

Figure 4:
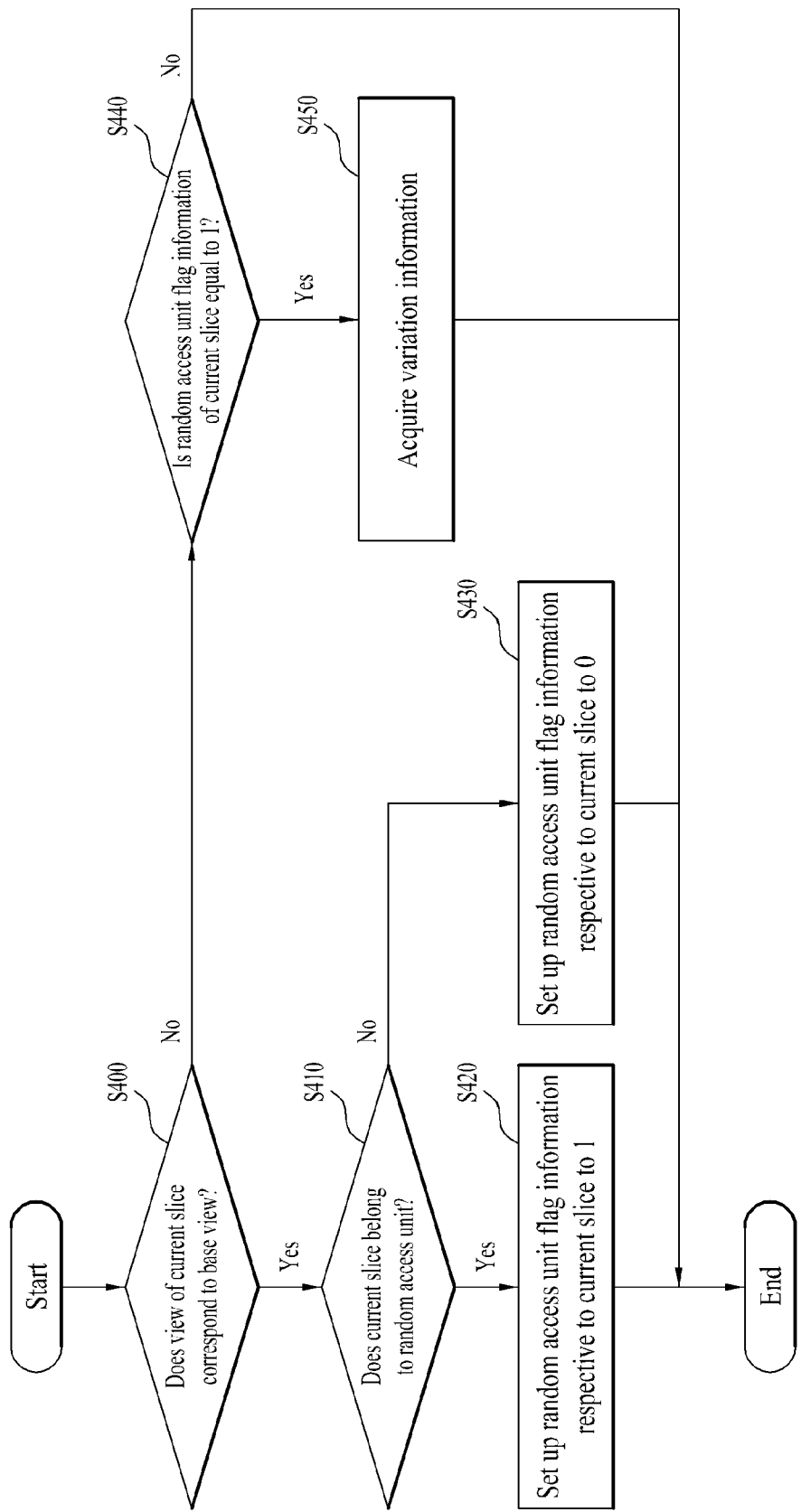
FIG. 4 illustrates a flow chart of a method for acquiring variation information from a bitstream as an exemplary embodiment having the present invention applied thereto.

FIG. 4 illustrates a flow chart of a method for acquiring variation information from a bitstream as an exemplary embodiment having the present invention applied thereto.

Referring to FIG. 4, it can be verified whether or not the view to which the current slice belongs corresponds to the base view (S400). The base view may signify a view that is independently decoded from another view without performing any inter-view prediction. Whether or not a view corresponds to a base view may be verified by using view identification information respective to the current slice. The view identification information signifies information indicating a view of a current sequence, and the view identification information may be acquired from a sequence parameter set, and so on. For example, in case decoded view identification information is equal to 0, it may be understood that the current slice belongs to a base view.

In case the current slice belongs to a base view, whether or not the current slice belongs to a random access unit may be verified (S410). A picture within a random access unit may signify a picture that is being coded by referring only to a slice that is located within a same time range. The picture within the random access unit may only perform inter-view prediction and cannot perform inter-screen prediction along a temporal direction (or time direction). Whether or not the current slice belongs to the random access unit may be verified based upon a NAL unit type information. For example, a CRA (Clean Random Access) picture type or an IDR (Instantaneous Decoding Refresh) picture type may correspond to a NAL unit type, which is allocated to a picture having a base view within the random access unit. Therefore, in case the NAL unit type information indicates the CRA (Clean Random Access) picture type or the IDR (Instantaneous Decoding Refresh) picture type, it may be understood that the current slice belongs to the random access unit.

In case the current slice belongs to a base view and a random access unit, random access unit flag information respective to the current slice may be set to 1 (S420). Conversely, in case the current slice belongs to the base view but does not belong to the random access unit, the random access unit flag information respective to the current slice may be set to 0 (S430). The random access unit flag information may signify information indicating whether or not the current slice belongs to the random access unit. The random access unit flag information, which is determined with respect to a slice belonging to the base view, may be equally applied to all slices belonging to the same access unit. For example, when the random access unit flag information is set to 1 with respect to a slice belonging to the base view and the random access unit, the random access unit flag information may also be set to 1 with respect to another slice belonging to a non-base view and a random access unit.

Random access unit flag information that is determined with respect to a current slice belonging to the non-base view may be verified (S440). As a result of the verification, in case the random access unit flag information is set to 1, variation information (or disparity information) may be acquired (S450). More specifically, the variation information of the present invention may be limited to being acquired only in case the current slice belongs to a non-base view and in case the current slice belongs to a random access unit.

Meanwhile, although a method for acquiring variation information in slice units is described in FIG. 3, the present invention will not be limited only to this, and, it will be apparent that the variation information may also be acquired in sequence units, picture units, and partition units having a predetermined size. The partition having a predetermined size may correspond to a coding block, which corresponds to a basic unit of video signal processing, and may also correspond to a predicting block, which corresponds to a block unit performing prediction between screens or prediction within a screen, and may also be specified by partition information, which decides a unit for transmitting the variation information. Additionally, in case a picture belonging to a non-base view and a random access unit is coded by being divided into multiple slices, the variation information may be transmitted with respect to only a first slice of the corresponding picture. In this case, a process of verifying whether or not the current slice corresponds to the first slice within a picture belonging to the non-base view and the random access unit may be additionally required.

Figure 5:
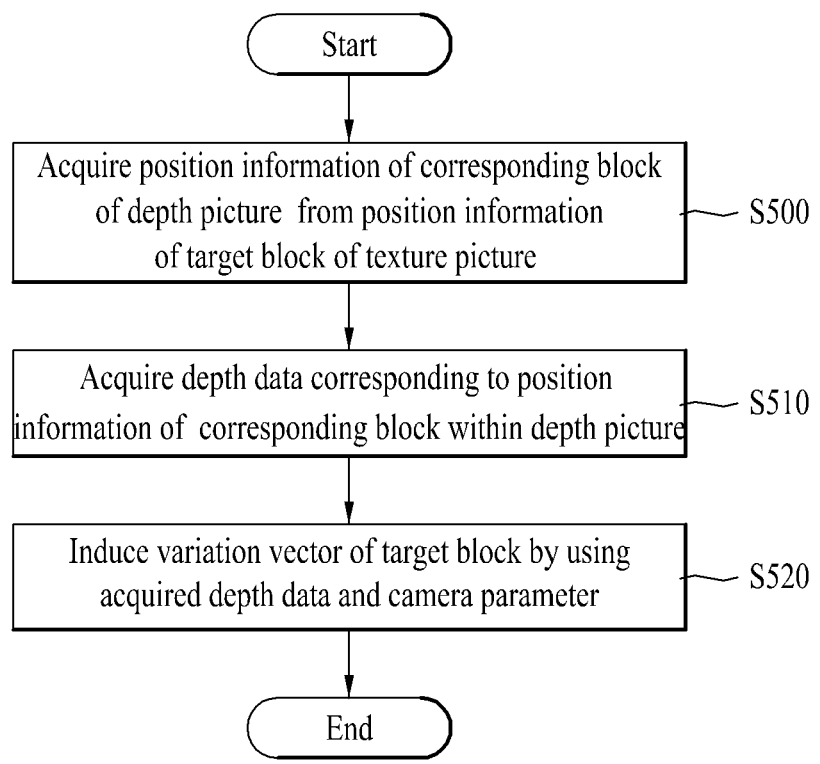
FIG. 5 illustrates a method for inducing a variation vector by using a depth picture as an exemplary embodiment having the present invention applied thereto.

FIG. 5 illustrates a method for inducing a variation vector by using a depth picture as an exemplary embodiment having the present invention applied thereto.

Referring to FIG. 5, position information of a corresponding block of a depth picture may be acquired from position information of a target block of a texture picture (S500). Any one of a) a predicted depth picture, b) a recovered depth picture, and c) a recovered and filtered depth picture may be selectively used as the depth picture that is being used in the present invention, and this will be described in more detail with respect to FIG. 6. A position of the corresponding block of the depth picture may be decided as a block that is collocated with a target block of a texture picture. However, a spatial resolution between the texture picture and the depth picture may be differently coded. This is because, based upon the characteristics of the depth information of indicating information on a distance between a camera and an object, the coding efficient may not be significantly degraded even if coding is performed by decreasing the spatial resolution. For example, in case the spatial resolution of the depth picture is coded to be lower than that of the texture picture, the decoder may accompany (or perform) an up-sampling process respective to the depth picture prior to acquiring the position information of the corresponding block of the depth picture. Moreover, in case aspect ratios between the up-sampled depth picture and the texture picture do not accurately match, offset information may be additionally considered when acquiring the position information of the corresponding block within the up-sampled depth picture. For example, the offset information may include at least one of upper offset information, left-side offset information, right-side offset information, and lower offset information. The upper offset information may indicate a position difference between at least one pixel located in an upper portion of the up-sampled depth picture and at least one pixel located in an upper portion of the texture picture. Each of the left-side, right-side, and lower offset information may be respectively defined by using the same method.

Depth data corresponding to the position information of a corresponding block within a depth picture may be acquired (S510). In case multiple pixels exist in the corresponding block, depth data corresponding to a corner pixel of the corresponding block may be used, and depth data corresponding to a center pixel of the corresponding block may also be used. Alternatively, among the multiple sets of depth data corresponding to the multiple pixels, a maximum value, a minimum value, and a modal value (or mode) may be selectively used, and an average value of the multiple sets of depth data may also be used.

A variation vector (or disparity vector) of a target block may be induced by using the acquired depth data and a camera parameter (S520). A more detailed induction method will be described with reference to Equations 6 and 7 shown below.

$$Z = \frac{1}{\frac{D}{255} \times \left(\frac{1}{Z_{near}} - \frac{1}{Z_{far}}\right) + \frac{1}{Z_{far}}} \quad \text{Equation 6}$$

Referring to Equation 6, Z indicates a distance from a camera of the corresponding pixel, and as a quantized value of Z, D corresponding to the depth data of the present invention. Each of Znear and Zfar respectively indicates a minimum value and a maximum value of Z, which is defined with respect to a view to which the depth texture belongs. Additionally, Znear and Zfar may be extracted from a bitstream through a sequence parameter set, a slice header, and so on, and Znear and Zfar may also correspond to information pre-defined within the decoder. Therefore, when the distance Z from the camera of the corresponding pixel is quantized as level 256, Z may be recovered by using the depth value, and Znear and Zfar, as shown in Equation 3. Thereafter, the variation vector respective to the target block may be induced by using Equation 7.

$$d = \frac{f \times B}{Z} \quad \text{Equation 7}$$

In Equation 7, f indicates a focal distance of the camera, and B indicates a distance between cameras. It may be assumed that f and B are the same with respect to all cameras, and, therefore, f and B may correspond to information that are pre-defined in the decoder.

Figure 6:
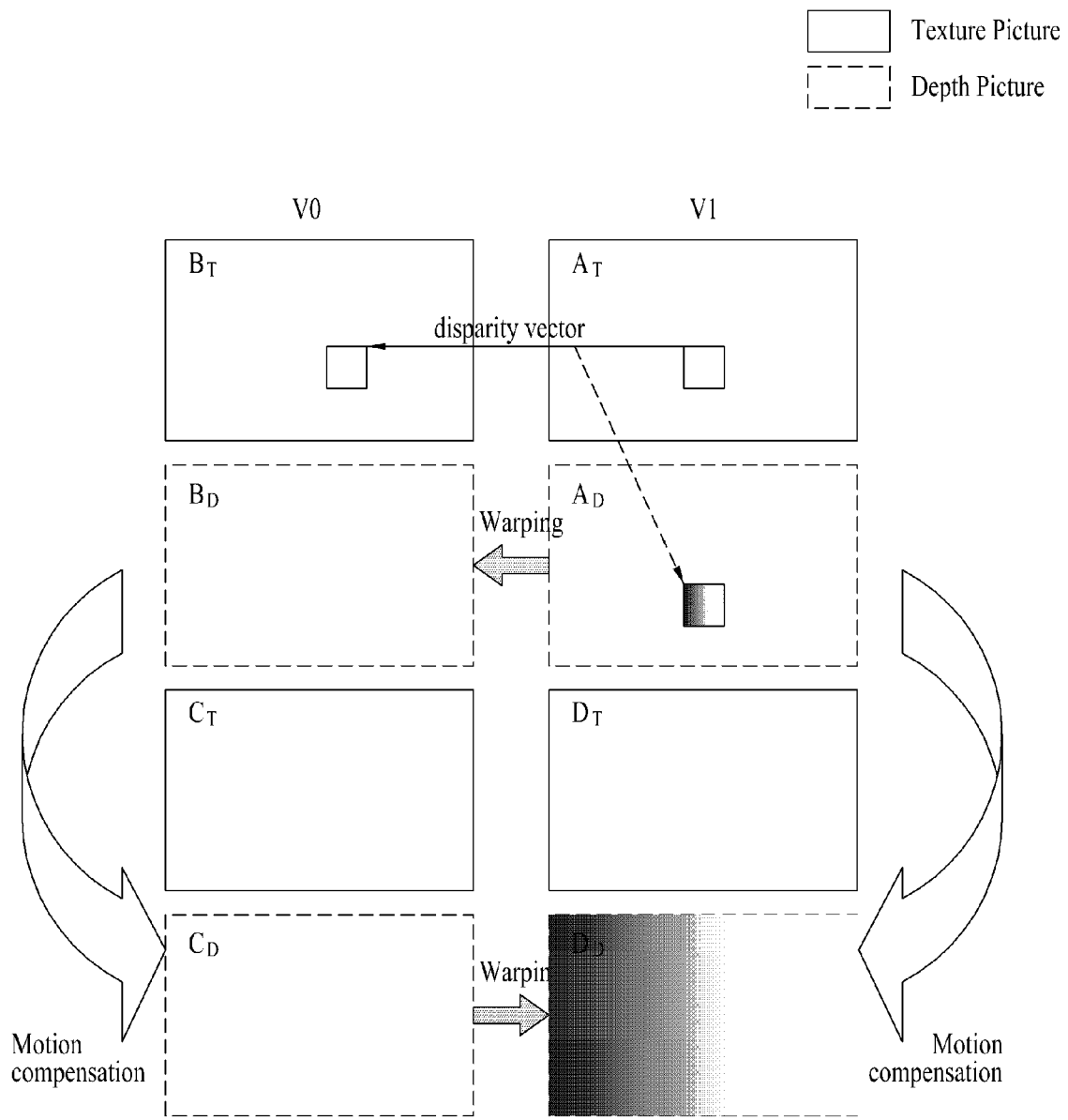
FIG. 6 illustrates a method for generating a depth picture as an exemplary embodiment having the present invention applied thereto.

FIG. 6 illustrates a method for generating a depth picture as an exemplary embodiment having the present invention applied thereto.

Referring to FIG. 6, as a depth picture corresponding to a texture picture AT, the depth picture AD belongs to the same time and the same view as the texture picture AT. Herein, in case the texture picture AT belong to a non-base view within a random access unit, the texture picture AT may only perform inter-view prediction and cannot perform inter-screen prediction along a time direction. Therefore, the texture picture AT may use a disparity vector (or variation vector) for the inter-view prediction. By inversely using the above-described Equations 3 and 4, depth data corresponds to a target block may be induced from a variation vector of a target block within the texture picture AT. By recording the induced depth data in the depth picture AD, a predicted depth picture may be generated (or created). Furthermore, the induced depth data may be recorded on a block located in the same position as the target block (or collocated block of the target block). However, in case a block that is coded as an intra mode exists in the texture picture AT, since the depth data cannot be induced due to the absence of the variation vector, the depth data respective to the block, which is coded as the intra mode, may be induced by using depth data of a neighboring block, which is already filled.

Alternatively, referring to a case of a depth picture DD of FIG. 6, the depth picture may be generated (or created) by using a depth picture, which is located in another pre-generated (or pre-created) time range. Herein, the depth picture, which is located in another time range, may perform a function of a reference picture, and this may be stored in a depth picture buffer. However, since a depth picture located at a different time range is used, motion compensation may be accompanied in order to enhance the accuracy of the prediction. For example, a reference block within a reference picture is specified by using a motion vector, which is acquired in block units with the depth picture DD, and reference index information, and the depth data of the specified reference block may be used as the predicted depth data of a target block within the current depth picture.

Additionally, the depth picture DD of FIG. 6 may be generated by using a depth picture located at another pre-generated view. For example, a depth picture DD of the current view (V1) may be generated by warping a depth picture CD corresponding to a neighboring view (V0) and the same time range to the current view (V1). The depth picture CD may correspond to a depth picture that is induced from a depth picture BD of another time range belonging to the same view while accompanying motion compensation. Additionally, a depth picture BD of the neighboring view (V0) may correspond to a depth picture that is generated by warping a depth picture AD of the current view (V1) to the neighboring view (V0).

The depth picture, which is generated by using the above-described method, corresponds to a predicted depth picture, and, in order to induce an accurate variation vector (or disparity vector), it may be preferable to use a recovered depth picture. For example, depth residual data respective to a depth picture may be extracted from a bitstream, and by performing inverse quantization and inverse conversion on the depth residual data, the depth residual data may be decoded. Herein, the depth residual data may be defined as differential data between the recovered depth data and the estimated depth data. By adding the decoded residual depth data to the predicted depth picture, a depth picture may be recovered.

Furthermore, in addition to the recovered depth picture, a filtered depth picture may also be used in the present invention. An in-loop filter may be applied to the recovered depth picture, and, by doing so, the picture quality of the corresponding image may be enhanced, and edge portions of each block may be adjusted. Herein, the region-based adaptive loop filter or the trilateral loop filter, which are shown in the in-loop filtering unit (500) of FIG. 2, may be used as the in-loop filter, and detailed description of the same will be omitted.

Hereinafter, a method for inducing a motion vector of a target block by using a variation vector (or disparity vector) of the target block will be described. In this specification, the term motion vector may be flexibly interpreted as a term signifying any one of a spatial motion vector, a temporal motion vector, and a variation vector (or disparity vector).

The variation vector, which is acquired as described above, may be set up as the motion vector of a target block. Alternatively, the variation vector may also be used as a predicted motion vector of the target block. In this case, a motion vector differential value may be coded and transmitted through a bitstream. The motion vector differential value may signify a differential vector between a recovered motion vector and a predicted motion vector. The decoder may extract the motion vector differential value from a bitstream via entropy decoding. Furthermore, a motion vector of a target block may be recovered by using the variation vector and the extracted motion vector differential value.

A motion vector of the target block may be induced by using a motion vector candidate list including the variation vector. Hereinafter, with reference to FIG. 7 to FIG. 9, a method for generating a motion vector candidate list and a method for inducing a motion vector of a target block from the generated (or created) motion vector candidate list will be described in detail.

Figure 7:
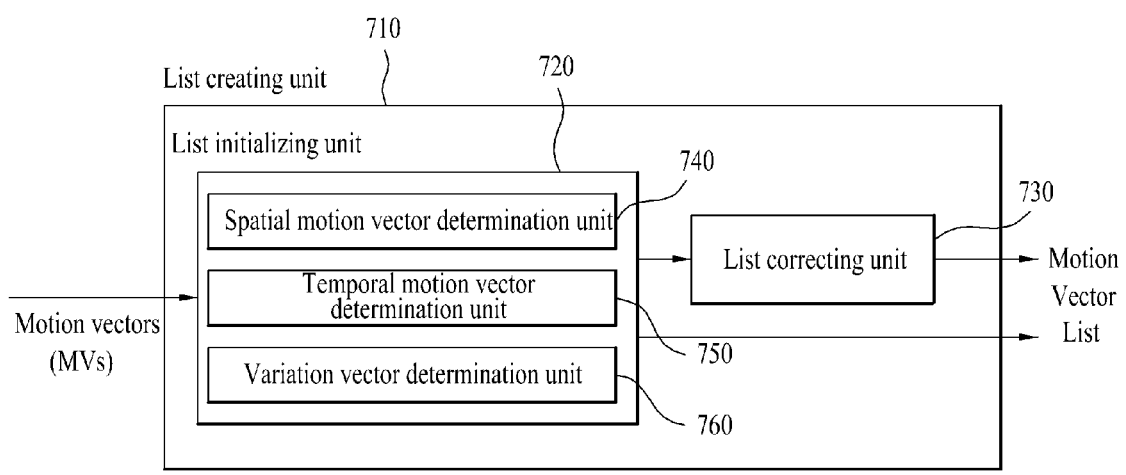
FIG. 7 illustrates a general configuration of a motion vector list creating unit (710) as an exemplary embodiment having the present invention applied thereto.

FIG. 7 illustrates a general configuration of a motion vector list creating unit (710) as an exemplary embodiment having the present invention applied thereto.

A motion vector list creating unit (710) of the present invention may be included in an inter prediction unit (700) of the decoder. The motion vector list creating unit (710) may be broadly configured of a list initializing unit (720) and a list correcting unit (730). The list initializing unit (720) may create (or generate) a motion vector list, which is configured of motion vector candidates that can be used as a predicted motion vector of the target block. The motion vector candidates of the present invention may include at least one of a spatial motion vector, a temporal motion vector, and a variation vector (or disparity vector). Additionally, as a motion vector indicated by a variation vector, a motion vector that is used by a reference block of a neighboring view may also be used as a motion vector candidate. A spatial motion vector determination unit (or spatial motion vector deciding unit) (740), which is included in the motion vector list initializing unit (720), may decide a spatial motion vector from a motion vector of a neighboring block that is spatially adjacent to the target block. The method for deciding the spatial motion vector will be described in more detail with reference to FIG. 7. A temporal motion vector determination unit (or temporal motion vector deciding unit) (750), which is included in the list initializing unit (720), may decide a temporal motion vector from a motion vector of a neighboring block that is temporally adjacent to the target block. For example, the temporally adjacent neighboring block may correspond to a block located in the same position as the target block (or collocated block of the target block) within a reference picture belonging to the same view as the target block. Herein, the reference picture may be specified by reference index information of a picture including the collocated block. Additionally, a variation vector determination unit (or variation vector (or disparity vector) deciding unit) (760), which is included in the list initializing unit (720), may decide a variation vector (or disparity vector) that is being added to the motion vector list. A method for adding the variation vector to the motion vector list will be described in more detail with reference to FIG. 8.

The motion vector list, which is created in the list initializing unit (720), may be used as a final motion vector list for inducing a motion vector of a target block, and the motion vector list may also be corrected by the list correcting unit (730) in order to remove (or eliminate) redundancy between the motion vector candidates. For example, the list correcting unit (730) may verify identity between spatial motion vectors within the motion vector list, which is created by the list initializing unit (720). Based upon the verified result, in case identical spatial motion vectors exist, any one of the two identical spatial motion vectors may be removed (or eliminated) from the motion vector list. Furthermore, after removing the redundancy between the motion vector candidates within the motion vector list, in case the number of motion vector candidates remaining in the motion vector list is less than 2, a zero motion vector may be added. Conversely, in case the number of motion vector candidates remaining in the motion vector list exceeds 2, even after removing the redundancy between the motion vector candidates, with the exception of 2 motion vector candidates, the remaining motion vector candidates may be removed from the motion vector list. Herein, the 2 motion vector candidates remaining in the motion vector list may each correspond to a motion vector candidate having a relatively small list identification index within the motion vector list. The list identification index is assigned to each motion vector candidate included in the motion vector list, and the list identification index may signify a number for identifying each motion vector candidate within the motion vector list.

Figure 8:
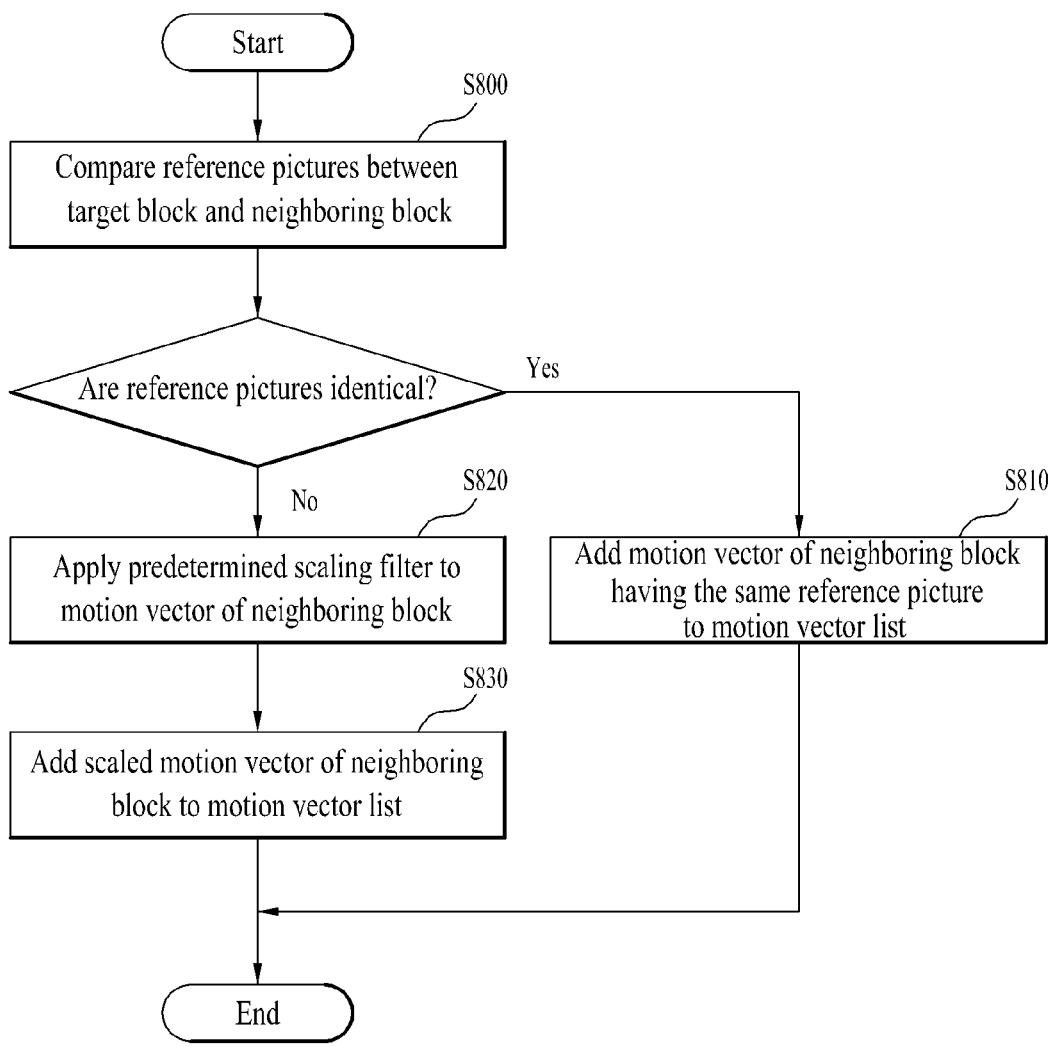
FIG. 8 illustrates a procedure for deciding a spatial motion vector as an exemplary embodiment having the present invention applied thereto.

FIG. 8 illustrates a procedure for deciding a spatial motion vector as an exemplary embodiment having the present invention applied thereto.

The spatial motion vector may be decided by a motion vector of a neighboring block spatially adjacent to a target block. The spatially adjacent neighboring block may signify any one of blocks respectively located on a left side, an upper side, a lower left side, an upper left side, and an upper right side of the target block. In deciding the spatial motion vector, whether or not the reference block of the target block is identical to the reference block of the neighboring block may be determined (S800). For example, in order to determine whether or not the reference block of the target block is identical to the reference block of the neighboring block, a comparison process determining whether or not the reference index information is identical may be performed. Alternatively, a comparison process determining whether or not POC (Picture Order Count) information allocated to a reference picture of a target block is identical to POC information allocated to a reference picture of a neighboring block may be performed. Even in case reference picture lists used by the target block and the neighboring block are different from one another, by comparing the POC information allocated to the reference picture, whether or not the reference pictures are identical to one another may be determined. The POC information corresponds to information indicating an output order of the picture or a temporal order of the picture, and this is because the output order corresponds to an intrinsic (or unique) value of each picture. Additionally, a process of determining whether or not the reference pictures are identical to one another may be performed by dividing the spatially adjacent neighboring blocks into 2 groups. For example, a neighboring block adjacent to the left side of the target block and a neighboring block adjacent to the lower left side of the target block may be grouped as a first group, and a neighboring block adjacent to the upper side of the target block, a neighboring block adjacent to the upper left side of the target block, and a neighboring block adjacent to the upper right side of the target block may be grouped as a second group. In this case, the target block may determine whether or not its reference picture is identical to the reference picture of at least one of the neighboring blocks included in the first group, and the target block may also determine whether or not its reference picture is identical to the reference picture of at least one of the neighboring blocks included in the second group. And, the process of determining whether or not the reference pictures are identical to one another may be performed by comparing the target block and the neighboring blocks in accordance with a pre-decided order. For example, in case of the first group, the process of comparing the identity of the reference pictures may be performed in an order of the lower left neighboring block and the left-side neighboring block, and, in case of the second group, the process of comparing the identity of the reference pictures may be performed in an order of the upper right neighboring block, the upper side neighboring block, and the upper left-side neighboring block. According to step S800, in case the reference pictures of the target block and the neighboring blocks are determined to be identical to one another, a motion vector of the neighboring block having the same reference picture may be added to the motion vector list (S810). Conversely, in case the reference pictures of the target block and the neighboring blocks are determined not to be identical to one another, a predetermined scaling factor may be applied to the motion vector of the neighboring block (S820). The scaling factor may be decided based upon a temporal distance between a current picture including the target block and a reference picture of the target block. For example, the scaling factor may be decided based upon a differential value between POC information allocated to the current picture and POC information allocated to the reference picture of the target block. Moreover, a temporal difference between the current picture and a reference picture of a neighboring block may also be further considered. For example, the scaling factor may also be decided based upon a differential value between the POC information allocated to the current picture and the POC information allocated to the reference picture of a neighboring block. The scaled motion vector of the neighboring block may be added to the motion vector list (S830).

Hereinafter, a method for adding a variation vector to a motion vector list will be described in detail. As described in FIG. 3 to FIG. 6, the variation vector may be extracted from the bitstream, and the variation vector may also be induced by using a depth picture. As a motion vector candidate of the target block, the extracted or induced variation vector may be added to the motion vector list. In addition to the variation vector, as another motion vector candidate of the target block, it will be evident that a motion vector of the reference block, which is indicated by the variation vector, can be added to the motion vector list. However, as shown in the exemplary embodiment of FIG. 3, in case the variation vector is paired with view identification information of a reference view and then transmitted, a method for adding a variation vector to the motion vector list will be described in detail with reference to FIG. 9.

Figure 9:
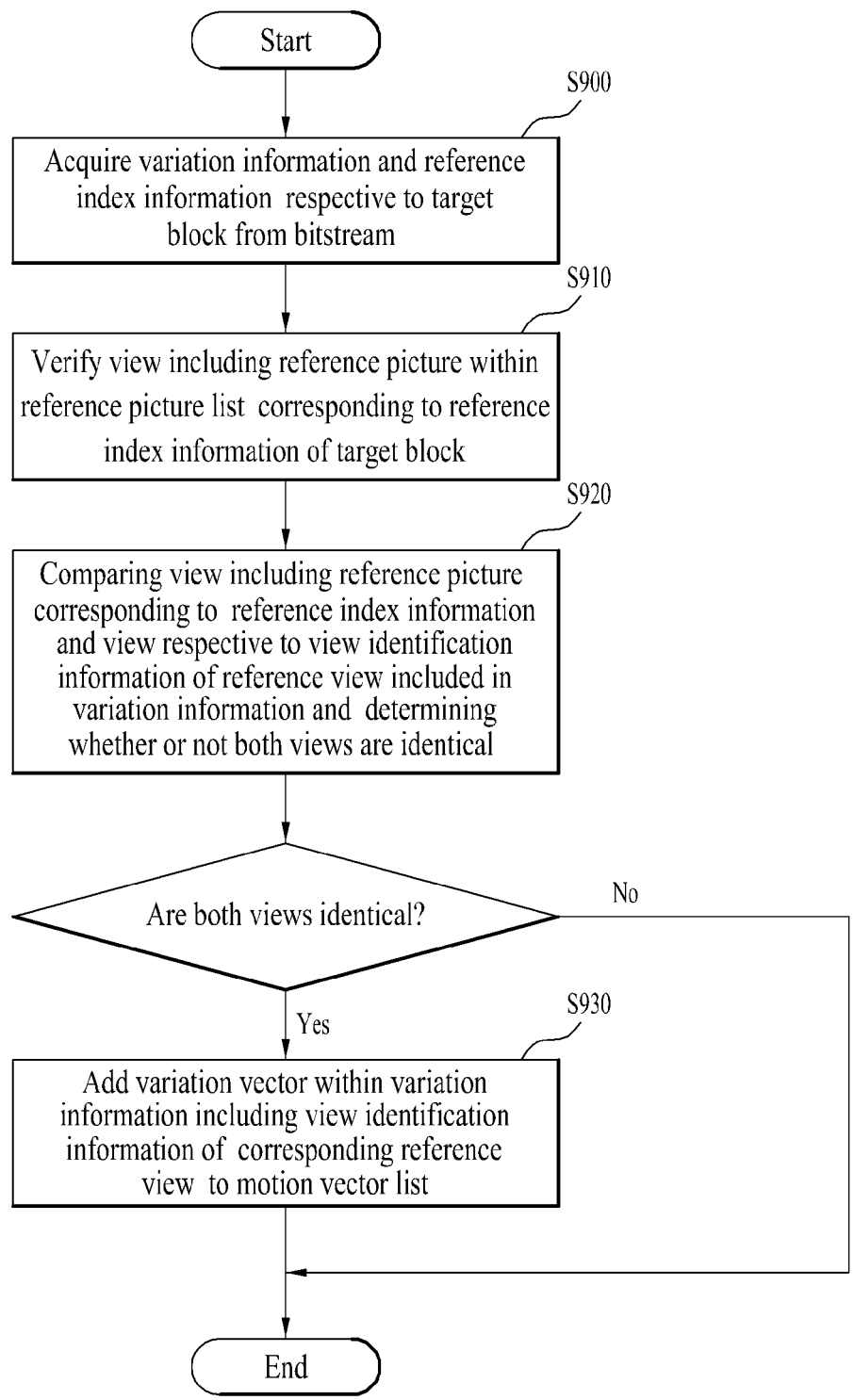
FIG. 9 illustrates a method for adding a variation vector, which is included in variation information, to a motion vector list as an exemplary embodiment having the present invention applied thereto.

FIG. 9 illustrates a method for adding a variation vector, which is included in variation information, to a motion vector list as an exemplary embodiment having the present invention applied thereto.

Referring to FIG. 9, variation information and reference index information respective to the target block may be acquired from a bitstream (S900). As described above, the variation information is described to include view identification information of a reference view and a variation vector. As a number allocated to a reference picture included in a reference picture list, the reference index information may signify information identifying a reference picture of a target block. A view to which a reference picture belongs may be verified (S910), wherein the reference picture is included in a reference picture list corresponding to the reference index information of a target block. This may be verified based upon view identification information respective to a sequence to which the reference picture belongs. A comparison process determining whether or not a view to which a reference picture corresponding to the reference index information belongs is identical to a view respective to view identification information of a reference view included in the variation information may be performed (S920). According to step S920, when it is verified that the two views are identical, a variation vector within variation information, which includes view identification information of the corresponding reference view, may be added to the motion vector list (S930). Herein, in case the current picture including a target block belongs to a non-base view within a random access unit, the variation vector of the target block within the motion vector list may have the smallest list identification information. In case the current picture belongs to a random access unit and a non-base view, only inter-view prediction will be allowed to be performed, and, since this signifies that only the variation vector is being used, this is to enhance the coding efficiency by allocating the lowest index. However, the position of the variation vector being added to the list will not be limited only to this, and, in order to provide backward compatibility with the conventional codec, the variation vector may be added to a last position within the motion vector list. Conversely, according to step S920, when it is verified that the two views are not identical, a variation vector within variation information, which includes view identification information of the corresponding reference view, may not be added to the motion vector list.

The method for creating a motion vector list has been described above with reference to FIG. 7 to FIG. 9, and, hereinafter, a method of an inter prediction unit (700) for inducing a motion vector of a target block from the motion vector list will be described in detail.

Motion vector identification information respective to a target block may be extracted from a bitstream. The motion vector identification information may correspond to information specifying a motion vector candidate within a motion vector list, which is used as a predicted motion vector of the target block. More specifically, a motion vector candidate corresponding to the extracted motion vector identification information may be extracted from a motion vector list, and the extracted motion vector candidate may be set up as a predicted motion vector of the target block. Additionally, a differential value between motion vectors, which are coded with respect to the target block, may be transmitted through a bitstream. The motion vector differential value may signify a differential vector between decoded motion vector and a predicted motion vector. A motion vector of the target block may be decoded by using a differential value between a predicted motion vector, which is acquired from the motion vector list, and a motion vector, which is extracted from a bitstream. A pixel value of the target block may be predicted by using the decoded motion vector and the reference picture list. Herein, the reference picture list may include reference pictures for temporal prediction as well as reference pictures for inter-view prediction.

As described above, a decoding/encoding device having the present invention applied therein may be equipped in a multimedia broadcast transmitting/receiving device, such as DMB (Digital Multimedia Broadcasting), and may be used for decoding video signal and data signals, and so on. Additionally, the multimedia broadcast transmitting/receiving device may include a mobile communication terminal.

Additionally, a decoding/encoding method having the present invention applied therein may be fabricated and produced as a program designed to be executed in a computer, thereby being stored in a recording medium that can be read by the computer, and multimedia data having a data structure according to the present invention may also be stored in a recording medium that can be read by the computer (or computer-readable recording medium). The computer-readable medium includes all types of recording devices, which store data that can be read by a computer system. Examples of the computer-readable recording medium include ROM, RAM, CD-ROM, magnetic tape, floppy disk, optical data storage device, and so on, and may also include media that can be realized in the form of carrier wave (e.g., transmission via Internet). Furthermore, a bitstream that is created by the encoding method may be stored in the computer-readable recording medium or may be transmitted by using a wired/wireless communication network.

INDUSTRIAL APPLICABILITY

The present invention may be used for coding video signals.

What is claimed is:

1. A video signal processing method, comprising:
    acquiring a disparity vector of a target block, the disparity vector indicating a difference between a position of the target block included in a current view and a position of a reference block included in a reference view;
    determining a motion vector list corresponding to the target block, the motion vector list including motion vector candidates being at least one of a spatial motion vector, a temporal motion vector, and the disparity vector of the target block;
    extracting motion vector identification information of the target block from a bitstream, the motion vector identification information indicating information for determining a predicted motion vector of the target block;
    determining one of the motion vector candidates corresponding to the motion vector identification information as the predicted motion vector of the target block; and
    performing motion compensation based on the determined predicted motion vector,
    wherein the temporal motion vector indicates a motion vector of a block being a same position as the target block included in the reference picture included in a same view as the target block, and
    wherein the reference picture included in the same view is specified by reference index information of a picture including the block located in the same position as the target block.

2. The method of claim 1, wherein the disparity vector and view identification information of the reference view are extracted from the bitstream based on information on a number of the disparity vector,
    wherein the information on the number of disparity vector indicates a number of pairs of coded view identification information of the reference view and the disparity vector, and
    wherein the view identification information of the reference view indicates a view identification information of a neighboring view being referred to by the current view.

3. The method of claim 1, wherein the acquiring the disparity vector comprises:
    acquiring position information of a corresponding block included in a depth picture using position information of the target block included in a texture picture;
    acquiring depth data corresponding to the position information of the corresponding block included in the depth picture; and
    acquiring the disparity vector of the target block by using the acquired depth data and a camera parameter.

4. The method of claim 2, wherein when a current slice including the target block included in a random access unit and the current slice is included in a non-base view, the disparity vector corresponding to the current slice is extracted,
    wherein the disparity vector corresponding to the current slice is the disparity vector of the target block,
    wherein a picture included in the random access unit indicates a picture being coded by referring only to a slice being located in a same time range,
    wherein the non-base view indicates a view that does not correspond to a base view, and
    wherein the base view indicates a view that is decoded independently from another view without performing any inter-view prediction.

5. The method of claim 3, further comprising:
    deciding whether or not to apply a region-based adaptive loop filter to a current pixel value based on a variance of a depth block included in the depth picture, the variance of the depth block indicating a differential value between a maximum pixel value and a minimum pixel value in the depth block;
    acquiring the current pixel value being filtered by applying a weight value to a neighboring pixel value when the region-based adaptive loop filter is applied, the neighboring pixel value indicating one of pixel values included in the depth block excluding the current pixel value, and
    wherein the depth data are acquired from a depth picture to which being applied the region-based adaptive loop filter.

6. The method of claim 1, wherein the determining the motion vector list corresponding to the target block comprises:
    checking whether or not a reference picture of the target block is identical to a reference picture of a neighboring block;
    adding a motion vector of the neighboring block to the motion vector list when the reference picture of the target block is identical to the reference picture of the neighboring block;
    applying a scaling factor to the motion vector of the neighboring block when the reference picture of the target block is not identical to the reference picture of the neighboring block, the scaling factor is determined based on a temporal distance between a current picture including the target block and the reference picture of the target block; and
    adding the scaled motion vector of the neighboring block to the motion vector list.

7. The method of claim 2, comprising:
    extracting reference index information of the target block from a bitstream;
    determining whether or not a view of a reference picture corresponding to the reference index information of the target block is identical to a view respective to view identification information of the reference view; and
    adding a disparity vector corresponding to the view identification information of the reference view to a motion vector list when the view of the reference picture corresponding to the reference index information of the target block is identical to the view respective to view identification information of the reference view.

* * * * *